US006356290B2

(12) United States Patent
Taii

(10) Patent No.: US 6,356,290 B2
(45) Date of Patent: Mar. 12, 2002

(54) IMAGE FORMING APPARATUS

(75) Inventor: Tatsuya Taii, Hyogo (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/770,390

(22) Filed: Jan. 29, 2001

(30) Foreign Application Priority Data

Jun. 30, 2000 (JP) ........................................ 2000-198066

(51) Int. Cl.[7] .............................. B41J 2/385; B41J 2/45; G03G 13/04; H04N 1/23
(52) U.S. Cl. ........................ 347/130; 347/131; 358/296
(58) Field of Search ................................. 347/131, 130, 347/254, 253; 358/296

(56) References Cited

U.S. PATENT DOCUMENTS 5,166,999 A    11/1992   Rees et al.
5,485,278 A  * 1/1996    Nakajima .................... 358/296
5,793,496 A  * 8/1998    Morigami .................... 358/296

FOREIGN PATENT DOCUMENTS

JP    5-238062    9/1993
JP    6-336054   12/1994

* cited by examiner

Primary Examiner—Susan S. Y. Lee
(74) Attorney, Agent, or Firm—Armstrong, Westerman & Hattori, LLP

(57) ABSTRACT

An image forming apparatus is provided for producing an array of dots in the primary scanning direction based on image data prepared for one line. The apparatus includes enlarging means for enlarging the image data n times in the primary scanning direction to form images with a resolution equal to (1/n) times a maximum resolution, where the n is a positive integer. The image forming apparatus also includes dot forming means for forming dots for n lines in the secondary scanning direction based on the enlarged image data.

9 Claims, 15 Drawing Sheets

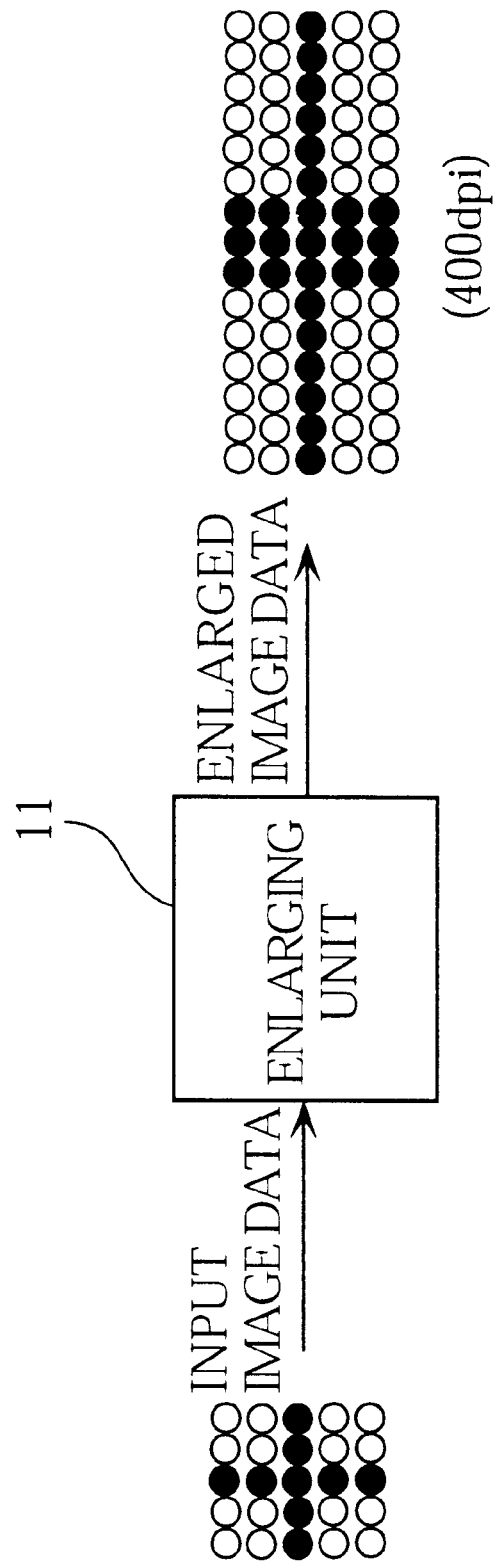

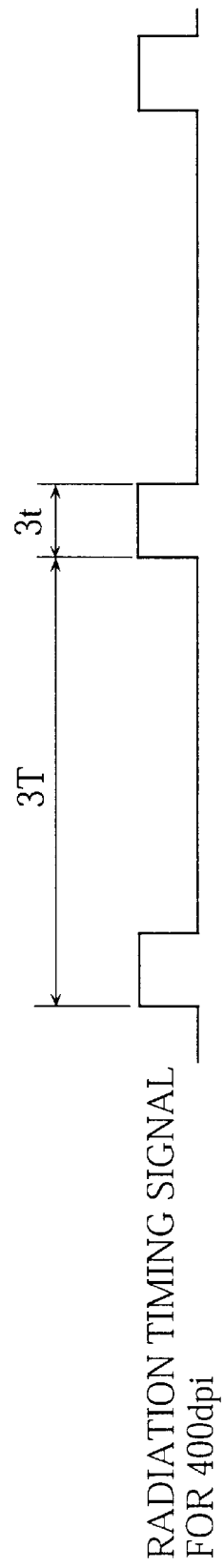

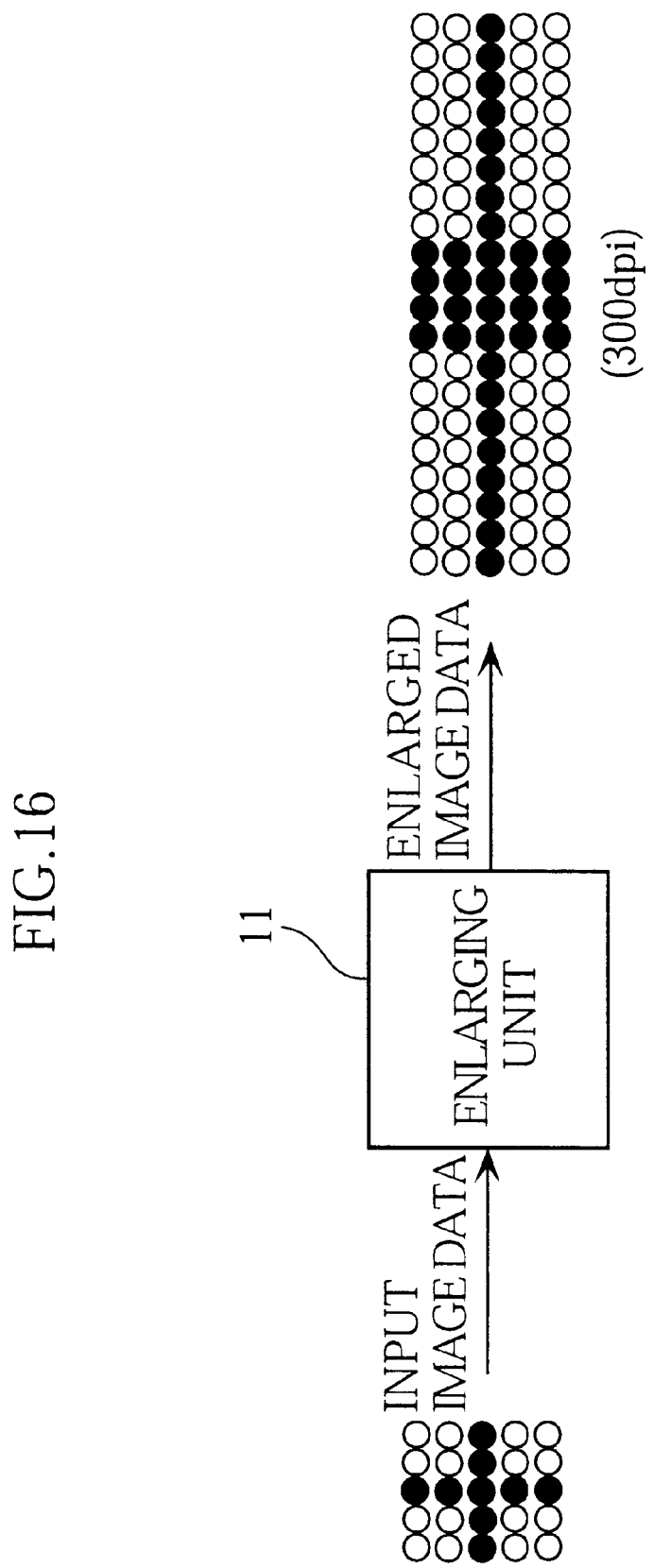

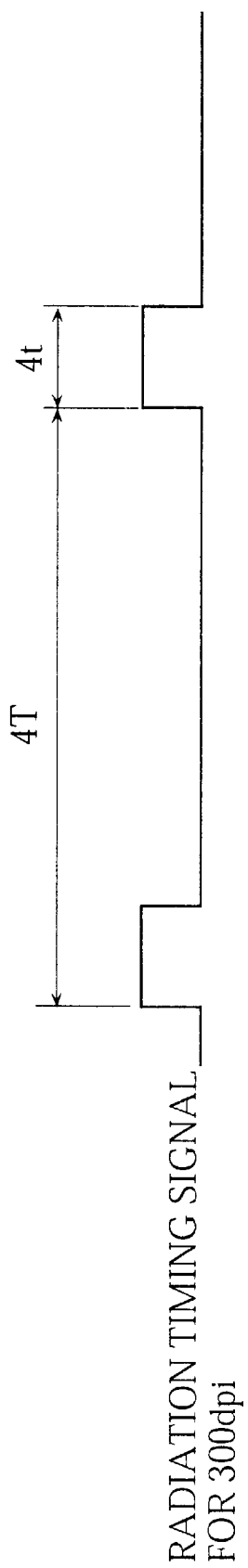

IMAGE FORMING APPARATUS

BACKGROUND OF THE INVENTION

1. Field of the Invention

The present invention relates to an image forming apparatus for forming a plurality of dots in the primary and secondary scanning directions.

2. Description of the Related Art

Conventional electrophotographic image forming apparatus are classified into a scanning type and a non-scanning type. In a scanning type apparatus, the surface of the photosensitive drum is scanned by a laser beam in the primary scanning direction to produce electrostatic latent images. To move the laser beam in the primary scanning direction, the scanning type apparatus may include a rotatable mirror for reflecting the beam. In a non-scanning type apparatus, on the other hand, use is made of an optical print head provided with a plurality of light-emitting diodes arranged in an array extending in the primary scanning direction. In operation, these light-emitting diodes are selectively activated based on one-line image data, so that the latent image corresponding to the one-line data is produced on the photosensitive drum.

A non-scanning type apparatus may be provided with more than one optical print head for enabling the switching of image-forming resolution. For example, three optical heads may be used for allowing the user to select one from three resolution modes (e.g. fine, intermediate and coarse). In this manner, however, the apparatus tends to be expensive and bulky due to the plural print heads.

JP-A-5(1993)-238062 and JP-A-6(1994)-336054 disclose non-scanning type image forming apparatus, in which use is made of only one optical print head, but still the switching of resolution is possible. For enabling the resolution switching, the apparatus of JP-A-5(1993)-238062 is provided with a refractivity-variable member disposed between the print head and the photosensitive member, while in the apparatus of JP-A-6(1994)-336054, the optical print head is designed to be moved toward or away from the photosensitive member.

The use of the above refractivity-variable member, however, is disadvantageous to achieving the downsizing of the image forming apparatus since extra space is needed for providing the refractivity-variable member. The movable print head of JP-A-6(1994)-336054 is also disadvantageous since a precisely-build driving mechanism is required for moving the print head relative to the photosensitive member.

SUMMARY OF THE INVENTION

The present invention has been proposed under the circumstances described above, and its object is to provide an image forming apparatus capable of switching from one resolution mode to another without causing an increase in cost and size.

According to a first aspect of the present invention, there is provided an image forming apparatus for producing an array of dots in a primary scanning direction based on image data prepared for one line. The apparatus includes: enlarging means for enlarging the image data n times in the primary scanning direction to form images with a resolution equal to (1/n) times a maximum resolution, where the n is a positive integer; and dot forming means for forming dots for n lines in a secondary scanning direction based on the enlarged image data.

Based on the same image data for one line, the dots for n lines are arranged in an identical pattern in the secondary scanning direction.

According to a second aspect of the present invention, there is provided an electrophotographic image forming apparatus including: an optical print head provided with an array of light-emitting elements extending in a primary scanning direction; a photosensitive member on which electrostatic latent images are produced; enlarging means for enlarging one-line image data n times in the primary scanning direction to form images with a resolution equal to (1/n) times a maximum resolution, where the n is a positive integer; and radiation controlling means for actuating the light-emitting elements n times with a predetermined actuation cycle based on the enlarged one-line image data.

The photosensitive member may be a photosensitive drum or photosensitive belt. The enlarged one-line image data may be supplied from the enlarging means to the print head with a data supply cycle equal to n times a minimum data supply cycle.

In a preferred embodiment of the present invention, the actuation cycle may be invariant as the positive integer n varies.

According to a third aspect of the present invention, there is provided an electrophotographic image forming apparatus including: an optical print head provided with an array of light-emitting elements extending in a primary scanning direction; a photosensitive member on which electrostatic latent images are produced; enlarging means for enlarging one-line image data n times in the primary scanning direction to form images with a resolution equal to (1/n) times a maximum resolution, where the n is a positive integer; and radiation controlling means for actuating the light-emitting elements with an actuation cycle equal to n times a minimum cycle based on the enlarged one-line image data.

Preferably, the minimum cycle may be used for performing maximum resolution printing. The light-emitting elements may be held in a light-emitting state for a time span corresponding to the positive integer n. This time span may be equal to n times a minimum time span.

According to the present invention, there is no need to prepare any optical parts or mechanical structure for performing the switching of resolution.

Other features and advantages of the present invention will become apparent from the detailed description given below with reference to the accompanying drawings.

BRIEF DESCRIPTION OF THE DRAWINGS

FIG. 14 illustrates how image data is processed by the second embodiment when the specified resolution is ⅓ of the maximum resolution or 400 dpi;

FIG. 15 shows the waveform of a radiation timing signal by the second embodiment when the specified resolution is 400 dpi;

FIG. 16 illustrates how image data is processed by the second embodiment when the specified resolution is ¼ of the maximum resolution or 300 dpi; and FIG. 17 shows the waveform of a radiation timing signal by the second embodiment when the specified resolution is 300 dpi.

DETAILED DESCRIPTION OF THE PREFERRED EMBODIMENTS

The preferred embodiments of the present invention will be described below with reference to the accompanying drawings.

Figure 1:
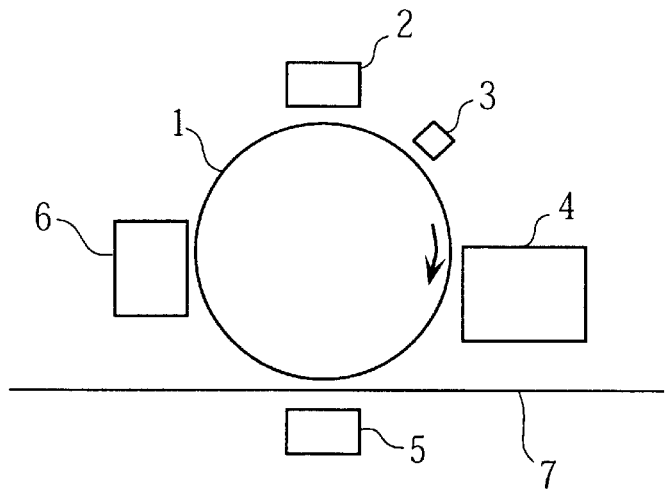
FIG. 1 is a schematic view showing an electrophotographic, image forming apparatus according to a first embodiment of the present invention.

FIG. 1 shows an electrophotographic (EP) image forming apparatus according to a first embodiment of the present invention. As illustrated, the EP apparatus includes a photosensitive drum 1, an electrostatic charger 2, an optical print head 3, an image developer 4, a transfer unit 5 and a toner cleaner 6.

In operation, the photosensitive drum 1 is caused to rotate at a predetermined rate in the direction shown by the arrow in FIG. 1. The charger 2 charges the entire surface of the drum 1 to a predetermined electric potential. For producing required latent images on the charged surface of the drum 1, the print head 3 irradiates the drum 1 with light. To this end, the print head 3 is provided with a plurality of light-emitting diodes (not shown) arranged in an array extending in the axial direction of the drum 1 (primary scanning direction). These LEDs are selectively turned on in accordance with one-line image data supplied to the print head 3. To produce the required latent images on the drum 1, a plurality of pieces of one-line image data may be successively supplied to the print head 3 as the photosensitive drum 1 is being rotated.

After the required latent images are composed on the drum 1, the image developer 4 applies toner to the surface of the drum 1 to develop the invisible latent images. Then, the transfer unit 5 transfers the toner-developed images onto recording paper 7 from the drum 1. The thus transferred images are fused onto the paper 7 by a fusing unit (not shown). Thereafter, the toner cleaner 6 removes the toner particles clinging to the drum 1.

Figure 2:
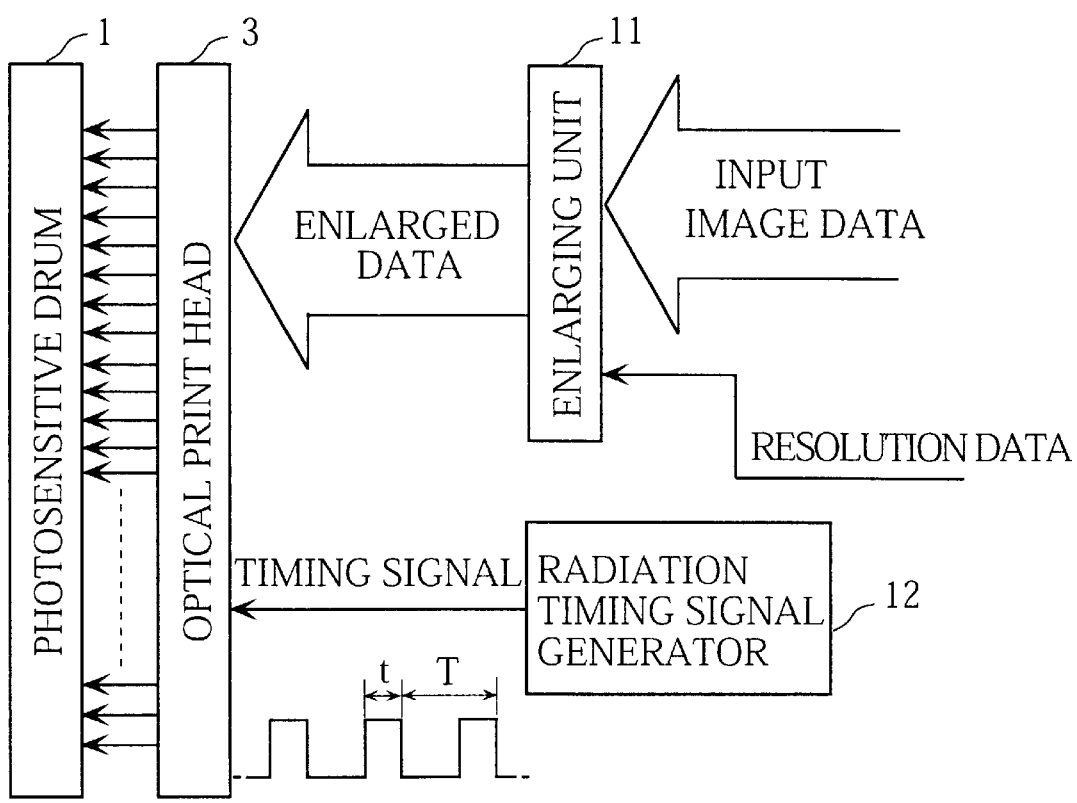
FIG. 2 is a block diagram showing principal elements of the electrophotographic apparatus of FIG. 1.

Referring now to FIG. 2, the EP apparatus includes an image data enlarging unit 11 and a radiation timing signal generating unit 12 in addition to the above-mentioned components 1-6. In accordance with resolution specifying data, the data enlarging unit 11 enlarges the image data supplied from an image data generating unit (not shown). The enlarging unit 11 may be realized by a logic circuit or CPU (central processing unit). The enlarged image data is sent to the print head 3 from the unit 11.

The print head 3 is provided with a buffer (not shown) for storing a piece of image data for one line. The timing signal generating unit 12 generates a radiation timing signal for actuating the LEDs of the print head 3 by a predetermined cycle T. The generated timing signal is sent to the print head 3, so that the LEDs of the print head 3 are turned on by the cycle T in accordance with the one-line data stored in the buffer of the print head 3. The timing signal generating unit 12 may be realized by a logic circuit or CPU.

The resolution specifying data may be generated by the user's manipulation of the operating section (not shown) of the EP apparatus, or may be supplied from an external host computer connected to the EP apparatus. Supposing that n is a positive integer, the data enlarging unit 11 will enlarge the supplied image data n times in the primary scanning direction when the resolution specifying data indicates that the resolution desired by the user is (1/n)×(the maximum resolution of the EP apparatus). The enlarged image data is supplied to the print head 3 from the unit 11 by the cycle equal to n×(the minimum cycle for the maximum resolution) In the first embodiment, the maximum resolution of the print head 3 is 1200 dpi (dot per inch). Thus, when the resolution specifying data indicates 120 dpi, 600 dpi, 400 dpi, 300 dpi and 200 dpi, the positive integer n is equal to 1, 2, 3, 4 and 6, respectively.

Figure 3:
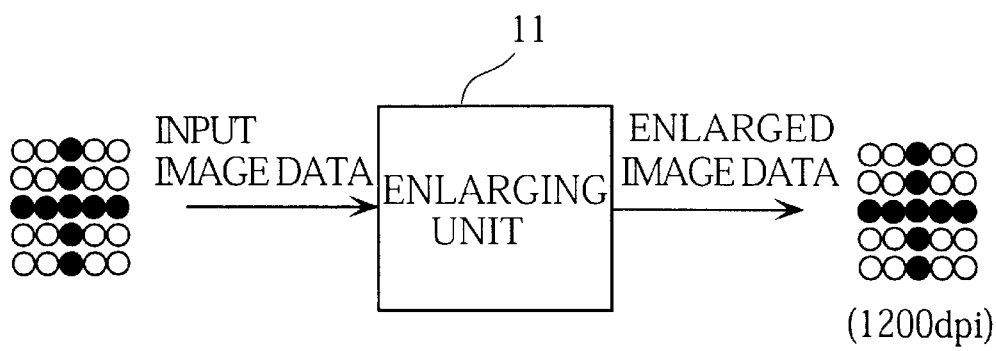
FIG. 3 illustrates how image data is processed when the specified resolution is a maximum of 1200 dpi.
Figure 4:
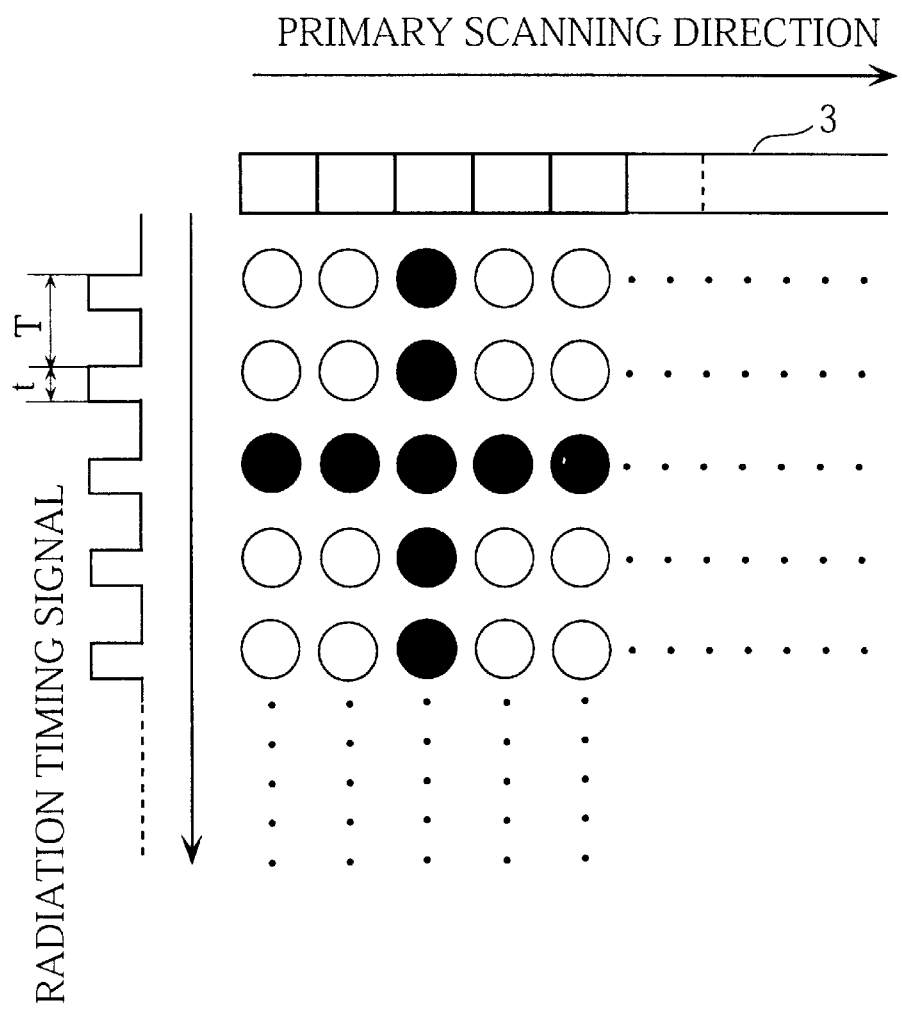
FIG. 4 illustrates how the latent image is produced by the maximum resolution.

FIG. 3 illustrates how the image data is processed by the unit 11 when the user-specified resolution is equal to the maximum 1200 dpi resolution, while FIG. 4 illustrates how the latent images are produced on the drum 1 when the user-specified resolution is equal to the maximum 1200 dpi resolution. For clarity, the dots to be toner-developed are blackened in FIGS. 3 and 4.

When the user-specified resolution is equal to the maximum 1200 dpi resolution, the positive integer n is 1 (1200÷1200), whereby the unit 11 does not enlarge the image data. Thus, the original image data is sent to the print head 3 without being modified. The LEDs of the print head 3 are turned on by the predetermined cycle T. Every time they are turned on, the LEDs continue to emit light for the predetermined time span t. Under these circumstances, the image data is supplied from the unit 11 to the print head 3 by the cycle equal to the actuation cycle T of the LEDs. Thus, the LEDs are turned on only once for each piece of one-line image data (see FIG. 4).

Figure 5:
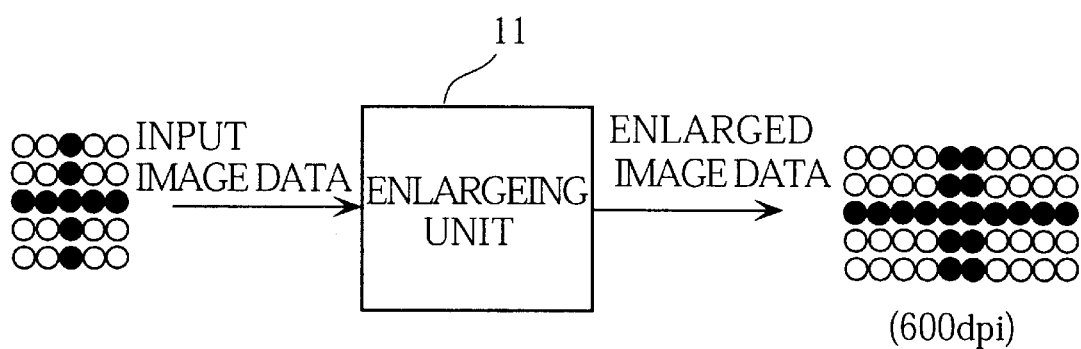
FIG. 5 illustrates how image data is processed when the specified resolution is ½ of the maximum resolution or 600 dpi.
Figure 6:
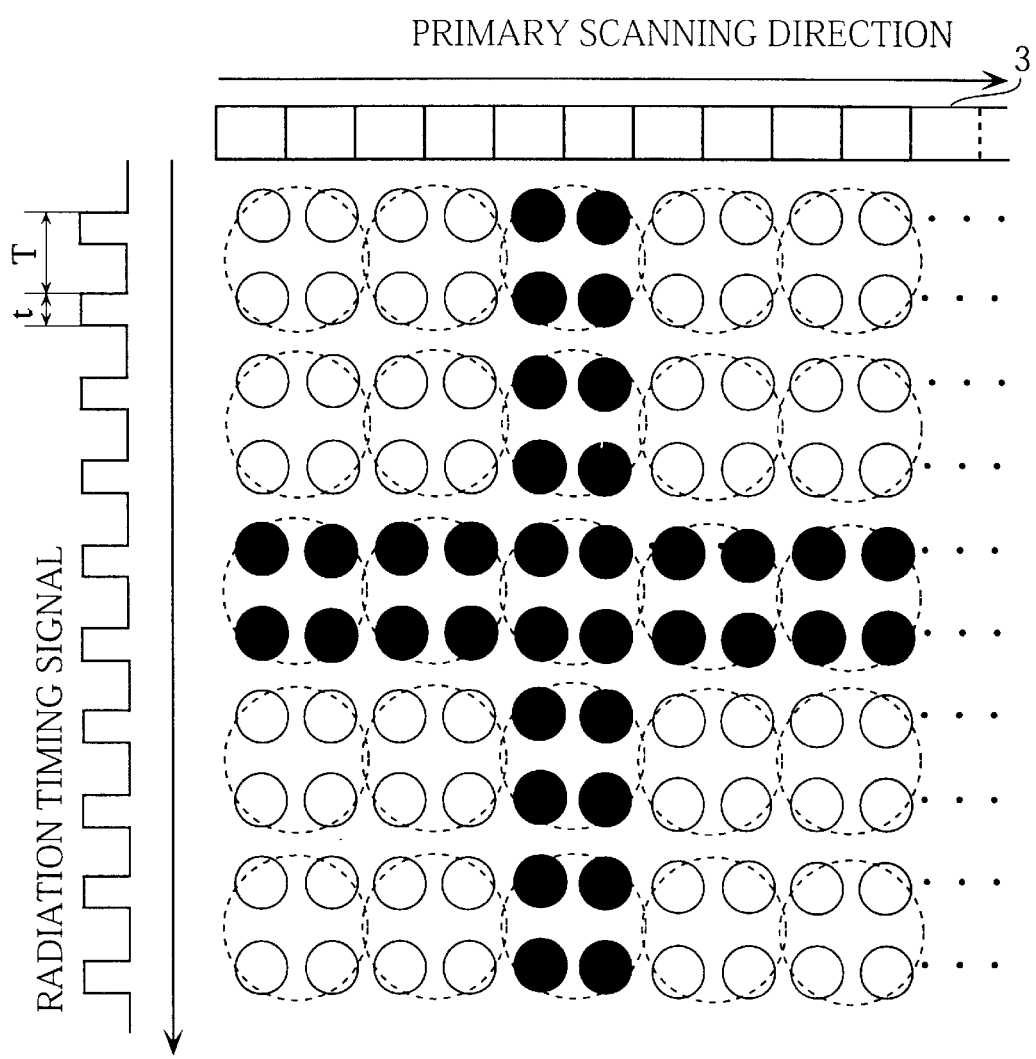
FIG. 6 illustrates how the latent image is produced by the 600 dpi resolution.

FIG. 5 illustrates how the image data is enlarged by the unit 11 when the user-specified resolution is equal to 600 dpi or (½)×(the maximum resolution), while FIG. 6 illustrates how the latent images are produced on the drum 1 when the user-specified resolution is 600 dpi. Since n=2, the unit 11 enlarges the supplied image data two times in the primary scanning direction. In this case again, the LEDs of the print head 3 are periodically turned on by the cycle T, and continue to emit light for the time span t. Under these circumstances, the image data is supplied from the unit 11 to the print head 3 by 2×(the actuation cycle T of the LEDs). Thus, the LEDs are turned on twice for each piece of one-line image data (see FIG. 6). In FIG. 6, two separate adjacent arrays of blackened dots extend vertically and horizontally. However, these two arrays are combined into a single vertical or horizontal array (see the circles of broken lines) after the toner-developed images are fused onto the recording paper 7.

Figure 7:
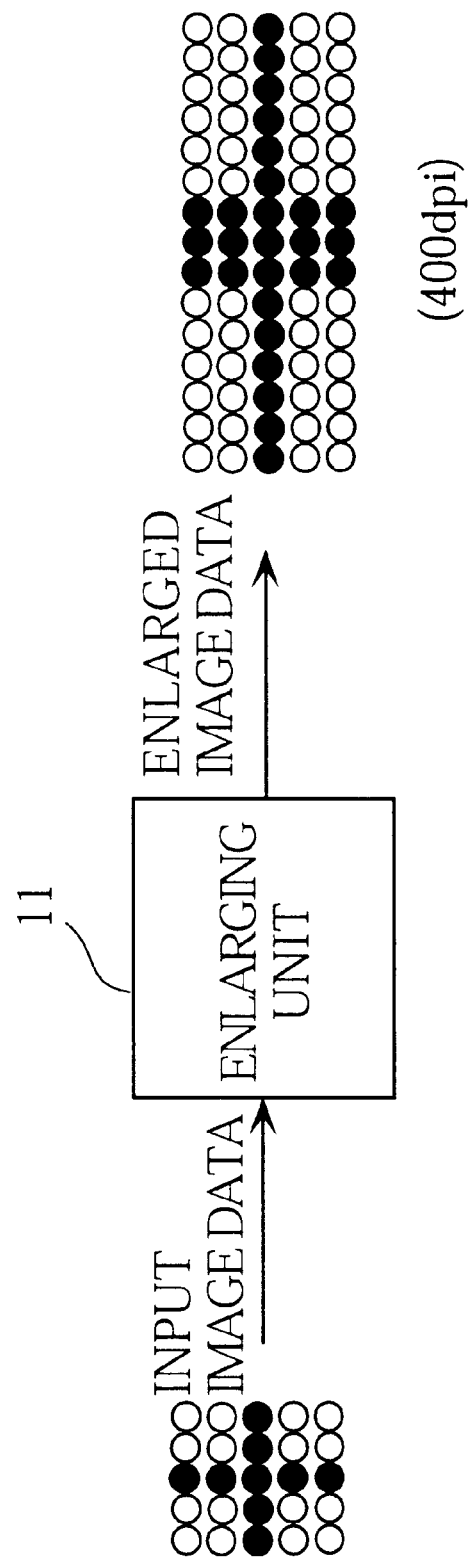
FIG. 7 illustrates how image data is processed when the specified resolution is ⅓ of the maximum resolution or 400 dpi.
Figure 8:
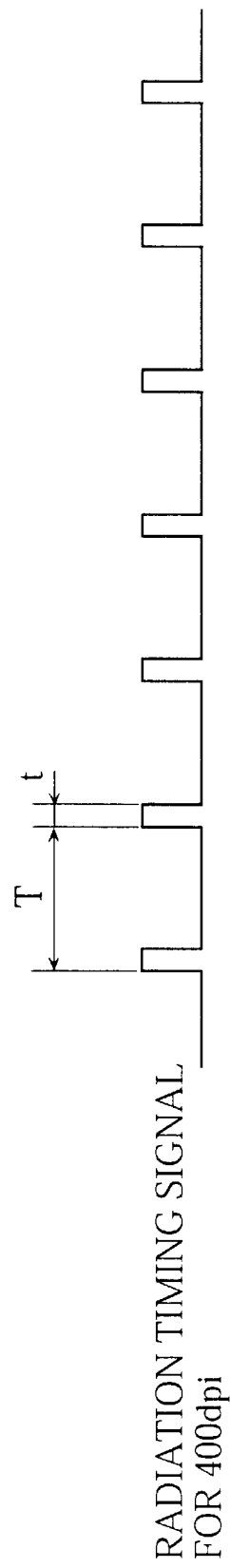
FIG. 8 shows the waveform of a radiation timing signal used when the specified resolution is 400 dpi.

FIG. 7 illustrates how the image data is enlarged by the unit 11 when the user-specified resolution is equal to 400 dpi or (⅓)×(the maximum resolution), while FIG. 8 illustrates the waveform of the radiation timing signal of the cycle T and the light-emitting time span t. Since n=3, the unit 11 enlarges the supplied image data three times in the primary scanning direction. In this case, the image data is supplied from the unit 11 to the print head 3 by 3×(the actuation cycle T of the LEDs). Thus, the LEDs are turned on three times for each piece of one-line image data.

Figure 9:
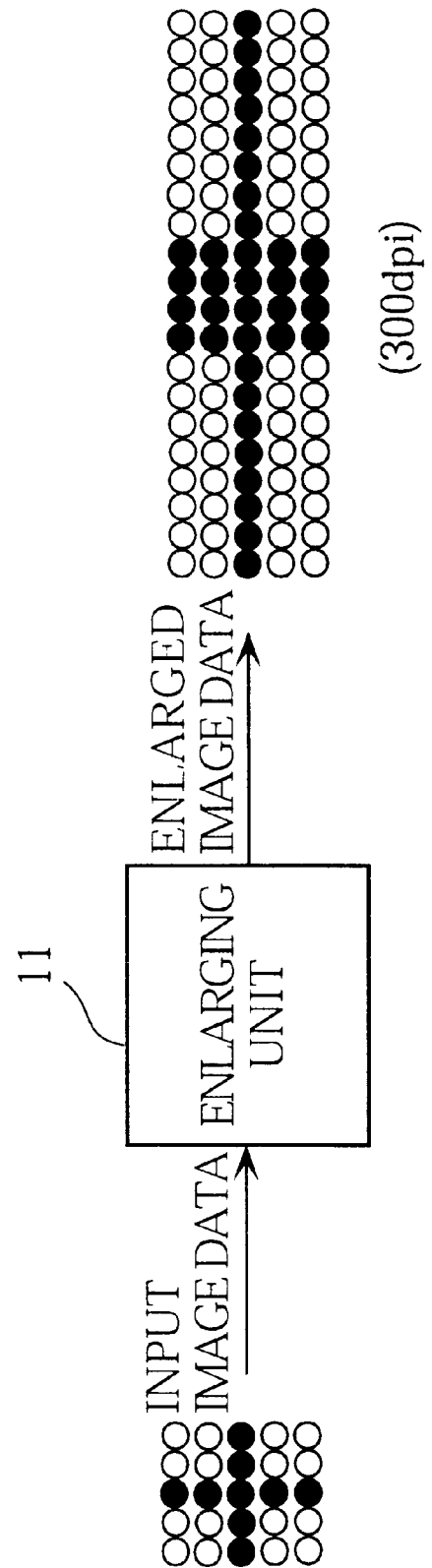
FIG. 9 illustrates how image data is processed when the specified resolution is ¼ of the maximum resolution or 300 dpi.
Figure 10:
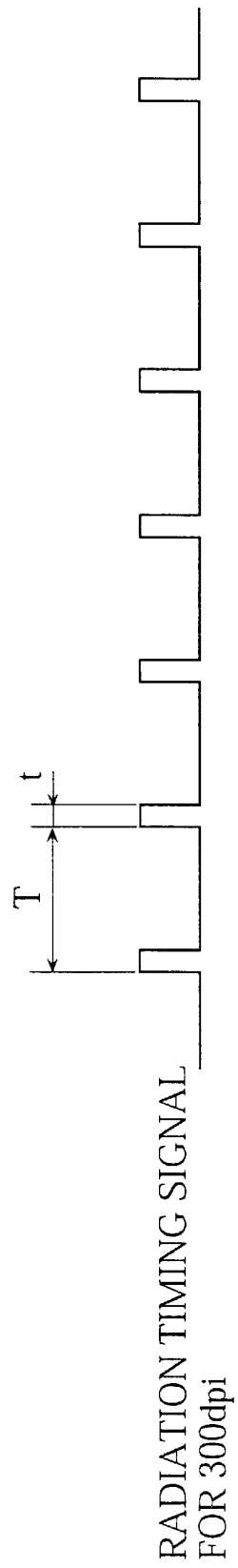
FIG. 10 shows the waveform of a radiation timing signal used when the specified resolution is 300 dpi.

FIG. 9 illustrates how the image data is enlarged by the unit 11 when the user-specified resolution is equal to 300 dpi or (¼)×(the maximum resolution), while FIG. 10 illustrates the waveform of the radiation timing signal having the cycle T and the light-emitting time span t. Since n=4, the unit 11 enlarges the supplied image data four times in the primary scanning direction. In this case, the image data is supplied from the unit 11 to the print head 3 by 4×(the actuation cycle T of the LEDs). Thus, the LEDs are turned on four times for each piece of one-line image data.

Figure 11:
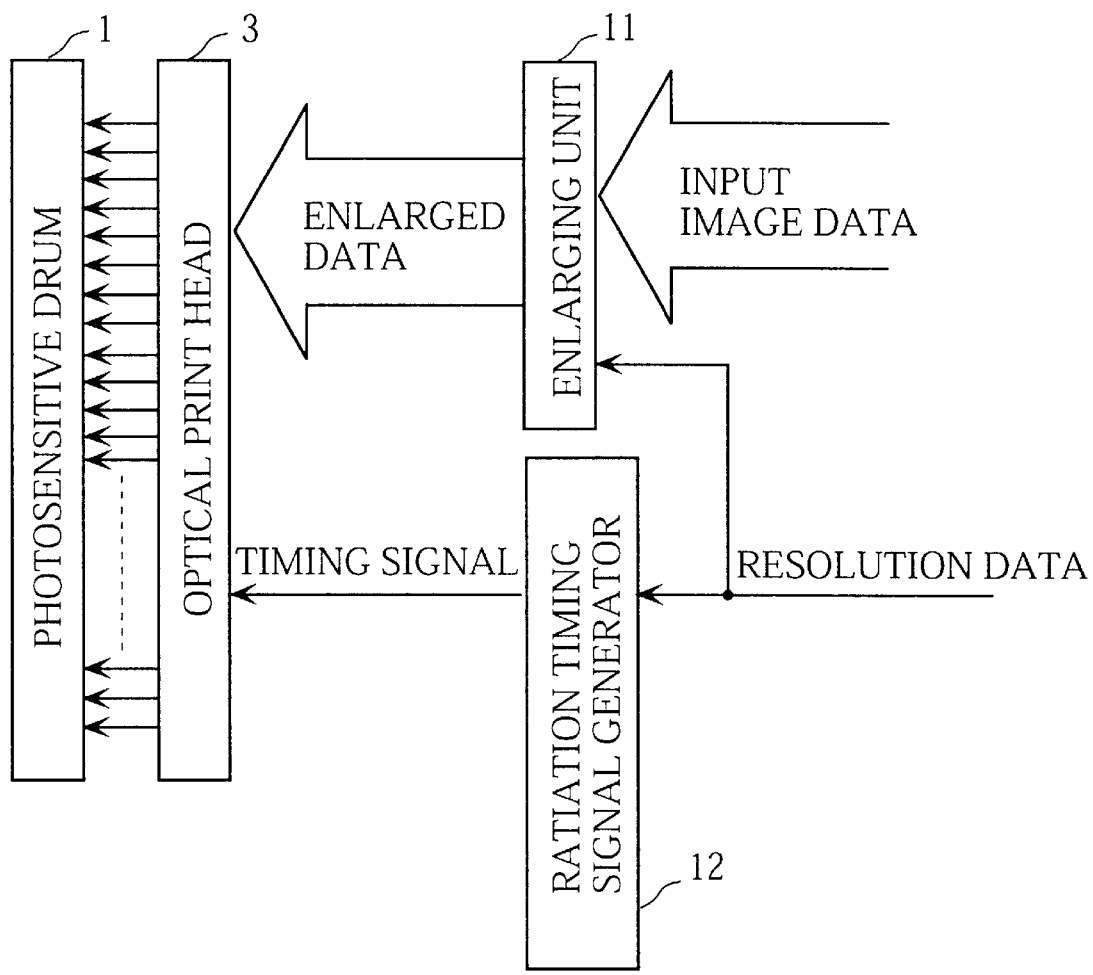
FIG. 11 is a block diagram showing principal elements of an electrophotographic, image forming apparatus according to a second embodiment of the present invention.

Reference is now made to FIG. 11 which is a circuit block diagram showing the principal components of an EP apparatus according co a second embodiment of the present invention. The EP apparatus of the second embodiment is the same as the EP apparatus of the first embodiment except that the resolution specifying data is supplied not only to the image data enlarging unit 11 but also to the radiation timing signal generating unit 12. In the EP apparatus of the second embodiment, the timing signal generating unit 12 causes the radiation actuating cycle to be n times longer when the resolution specifying data indicates that the resolution desired by the user is equal to (1/n)×(the maximum resolution).

Figure 12:
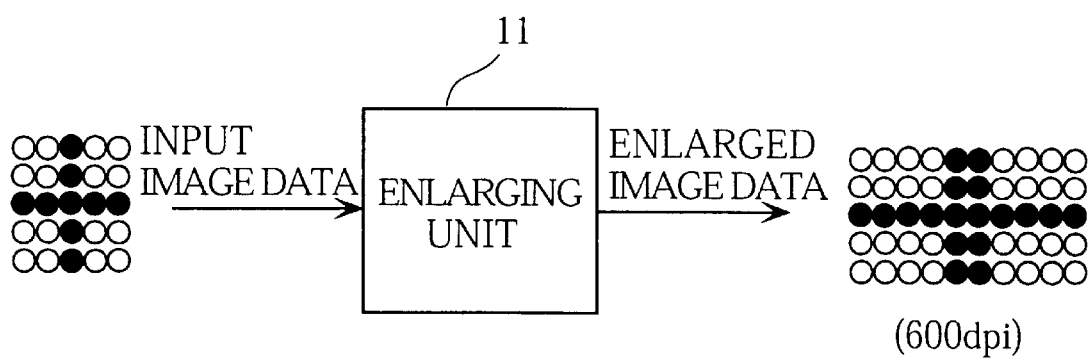
FIG. 12 illustrates how image data is processed by the second embodiment when the specified resolution is ½ of the maximum resolution or 600 dpi.
Figure 13:
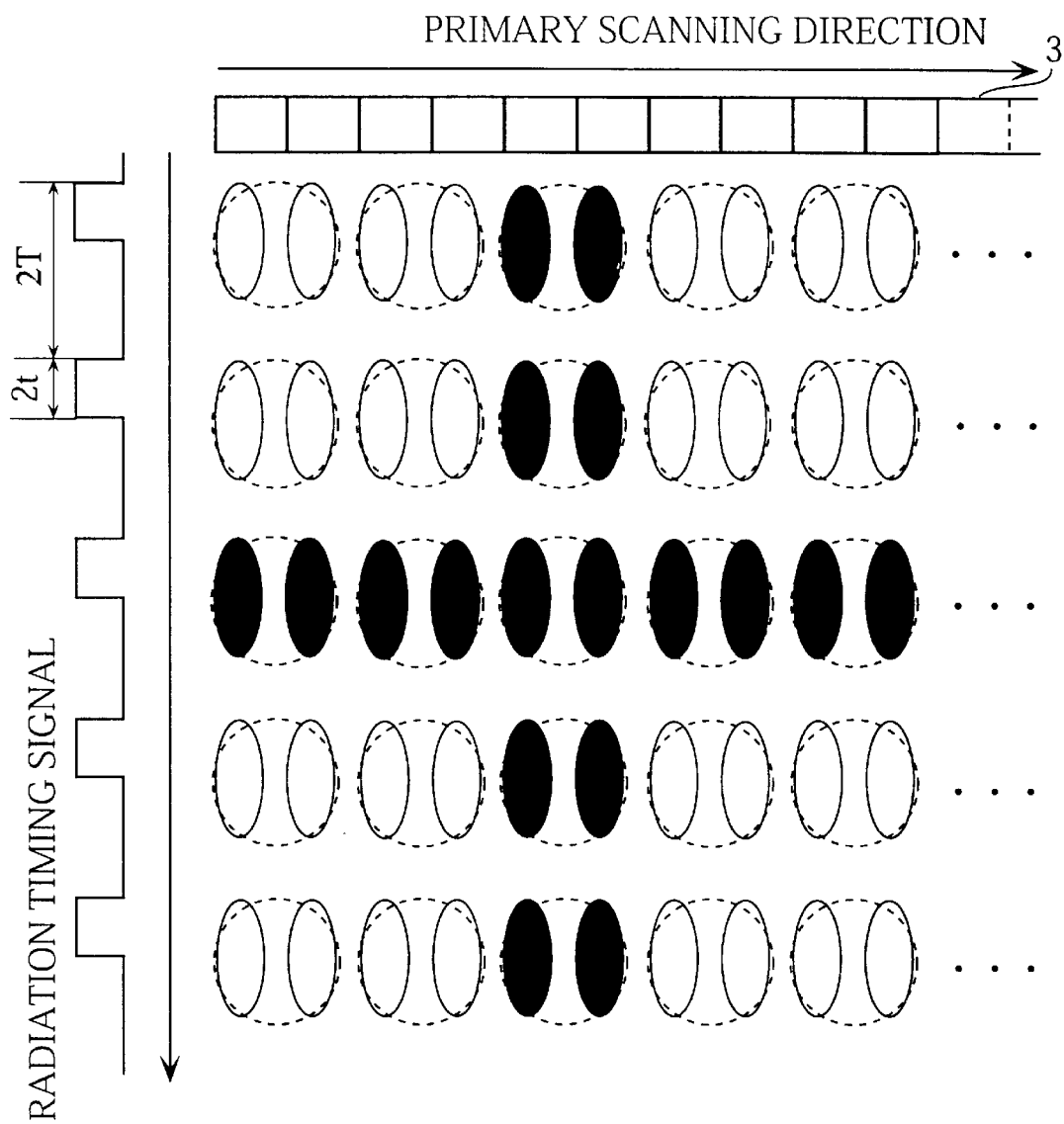
FIG. 13 illustrates how the latent image is produced by the second embodiment when the specified resolution is 600 dpi.

FIG. 12 illustrates how the image data is enlarged by the unit 11 when the user-specified resolution is equal to 600 dpi or (½)×(the maximum resolution), while FIG. 13 illustrates how the latent images are produced on the drum 1 when the user-specified resolution is 600 dpi. Since n=2, the unit 11 enlarges the supplied image data two times in the primary scanning direction, while the radiation timing signal is caused to have a cycle 2T and a light-emitting time span 2t. Under the control of such a timing signal, the LEDs of the print head 3 are turned on by the cycle 2T, whereby latent images of 600 dpi resolution are produced on the drum 1. Since n=2, the image data is sent to the print head 3 from the unit 11 by the cycle 2T. Thus, the LEDs are turned on only once for each piece of one-line image data. In this case, as shown in FIG. 13, each of the latent image dots is rendered oblong. However, each pair of toner-developed dots will be formed into a generally circular dot after the toner-developed dots are fused onto the recording paper 7.

FIG. 14 illustrates how the image data is enlarged by the unit 11 when the user-specified resolution is equal to 400 dpi or (⅓)×(the maximum resolution), while FIG. 15 shows the waveform of a radiation timing signal to be used when the user-specified resolution is 400 dpi. Since n=3, the unit 11 enlarges the supplied image data three times in the primary scanning direction, while the radiation timing signal is caused to have a cycle 3T and a light-emitting time span 3t. Under the control of such a timing signal, the LEDs of the print head 3 are turned on by the cycle 3T, so that latent images of 600 dpi resolution are produced on the drum 1. Since n=3, the image data is sent to the print head 3 from the unit 11 by the cycle 3T. Thus, in this case again, the LEDs are turned on only once for each piece of one-line image data.

FIG. 16 illustrates how the image data is enlarged by the unit 11 when the user-specified resolution is equal to 300 dpi or (¼)×(the maximum resolution), while FIG. 17 shows the waveform of a radiation timing signal to be used when the user-specified resolution is 300 dpi. Since n=4, the unit 11 enlarges the supplied image data four times in the primary scanning direction, while the radiation timing signal is caused to have a cycle 4T and a light-emitting time span 4t. Under the control of such a timing signal, the LEDs of the print head 3 are turned on by the cycle 4T, so that latent images of 300 dpi resolution are produced on the drum 1. Since n=4, the image data is sent to the print head 3 from the unit 11 by the cycle 4T. Thus, in this case again, the LEDs are turned on only once for each piece of one-line image data.

The present invention being thus described, it is obvious that the same may be varied in many ways. For instance, the present invention is applicable not only to an EP image forming apparatus but also to a non-EP image forming apparatus such as a thermal printer or inkjet printer. Such variations are not to be regarded as a departure from the spirit and scope of the present invention, and all such modifications as would be obvious to those skilled in the art are intended to be included within the scope of the following claims.

What is claimed is:

1. An image forming apparatus for producing an array of dots in a primary scanning direction based on image data prepared for one line, the apparatus comprising:

enlarging means for enlarging the image data n times in the primary scanning direction to form images with a resolution equal to (1/n) times a maximum resolution, where the n is a positive integer; and dot forming means for forming dots for n lines in a secondary scanning direction based on the enlarged image data.

2. The apparatus according to claim 1, wherein the dots for n lines are arranged in an identical pattern in the secondary scanning direction.

3. An electrophotographic image forming apparatus comprising:

an optical print head provided with an array of light-emitting elements extending in a primary scanning direction;

a photosensitive member on which electrostatic latent images are produced;

enlarging means for enlarging one-line image data n times in the primary scanning direction to form images with a resolution equal to (1/n) times a maximum resolution, where the n is a positive integer; and radiation controlling means for actuating the light-emitting elements n times with a predetermined actuation cycle based on the enlarged one-line image data.

4. The apparatus according to claim 3, wherein the enlarged one-line image data is supplied from the enlarging means to the print head with a data supply cycle equal to n times a minimum data supply cycle.

5. The apparatus according to claim 3, wherein the actuation cycle is invariant as the positive integer n varies.

6. An electrophotographic image forming apparatus comprising:

an optical print head provided with an array of light-emitting elements extending in a primary scanning direction;

a photosensitive member on which electrostatic latent images are produced;

enlarging means for enlarging one-line image data n times in the primary scanning direction to form images with a resolution equal to (1/n) times a maximum resolution, where the n is a positive integer; and radiation controlling means for actuating the light-emitting elements with an actuation cycle equal to n times a minimum cycle based on the enlarged one-line image data.

7. The apparatus according to claim 6, wherein the minimum cycle is used for performing maximum resolution printing.

8. The apparatus according to claim 6, wherein the light-emitting elements are held in a light-emitting state for a time span corresponding to the positive integer n.

9. The apparatus according to claim 6, wherein the light-emitting elements are held in a light-emitting state for a time span equal to n times a minimum time span.

* * * * *